(12) United States Patent
Wakabayashi

(10) Patent No.: US 11,435,567 B2
(45) Date of Patent: Sep. 6, 2022

(54) LIGHT SOURCE APPARATUS, PROJECTOR, AND MACHINING APPARATUS

(71) Applicant: SHIMADZU CORPORATION, Kyoto (JP)

(72) Inventor: Naoki Wakabayashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/209,578

(22) Filed: Mar. 23, 2021

(65) Prior Publication Data
US 2021/0302706 A1 Sep. 30, 2021

(30) Foreign Application Priority Data
Mar. 24, 2020 (JP) .............................. JP2020-052235

(51) Int. Cl.
| | |
|---|---|
| G02B 27/30 | (2006.01) |
| B23K 26/06 | (2014.01) |
| G03B 21/20 | (2006.01) |
| G02B 19/00 | (2006.01) |
| B23K 26/064 | (2014.01) |

(52) U.S. Cl.
CPC ........ *G02B 19/0014* (2013.01); *B23K 26/064* (2015.10); *G02B 19/0057* (2013.01); *G02B 27/30* (2013.01); *G03B 21/208* (2013.01); *G03B 21/2033* (2013.01)

(58) Field of Classification Search
None
See application file for complete search history.

(56) References Cited

U.S. PATENT DOCUMENTS

| | | | | |
|---|---|---|---|---|
| 2007/0237455 | A1 | 10/2007 | Sonoda et al. | |
| 2012/0257387 | A1* | 10/2012 | Kuchibhotla | ........... H01S 5/405 |
| | | | | 362/237 |
| 2013/0058124 | A1* | 3/2013 | Park | ......................... G02B 6/32 |
| | | | | 362/553 |

FOREIGN PATENT DOCUMENTS

| | | | |
|---|---|---|---|
| JP | 2007-163947 A | 6/2007 | |
| JP | 2020024242 A | * 2/2020 | ......... G02B 19/0095 |

* cited by examiner

*Primary Examiner* — Michelle M Iacoletti
*Assistant Examiner* — Danell L Owens
(74) *Attorney, Agent, or Firm* — Sughrue Mion, PLLC

(57) ABSTRACT

A light source apparatus 1 includes: a light emitter 2 having a plurality of laser diode devices 22 and packages 24 to hold the respective laser diode devices; a collimator 3 disposed on an optical path of a laser beam emitted from each of the laser diode devices; a focusing lens 5 disposed on a downstream side in a direction of an optical axis of each laser diode device relative to the collimator 3 and configured to condense the laser beams; a light guide 6 disposed on the downstream side in the direction of the optical axis relative to the focusing lens 5; and a magnification optical system 4 disposed between the collimator 3 and the focusing lens 5 to bring a beam diameter $W\alpha 2\text{-}1$ in a slow axis direction of the laser beam transmitted through the collimator 3 close to a beam diameter $W\alpha 1\text{-}2$ in a fast axis direction.

10 Claims, 7 Drawing Sheets

US 11,435,567 B2

LIGHT SOURCE APPARATUS, PROJECTOR, AND MACHINING APPARATUS

BACKGROUND OF THE INVENTION

1. Field of the Invention

The present invention relates to a light source apparatus, a projector, and a machining apparatus.

2. Description of the Related Art

There are multiplexing optical systems that causes laser beams exited from a plurality of semiconductor laser light emitters to be incident on an optical fiber and multiplexed into one (e.g., refer to JP 2007-163947 A). The multiplexing optical system described in JP 2007-163947 A (hereinafter, referred to as the "multiplexing optical system of Conventional Example 1") is configured with: a plurality of semiconductor laser light emitters disposed in a matrix; a plurality of collimator lenses to shape laser beams exited from the respective semiconductor laser light emitters into parallel light; a first focusing lens (cylindrical lens) to condense the laser beams passed through the collimator lenses only on either one of a plane containing a slow axis direction and a plane containing a fast axis direction; a second focusing lens (anamorphic lens) to condense the laser beams passed through the first focusing lens on both the two planes together with the first focusing lens; and an optical fiber on which each laser beam passed through the second focusing lens is incident.

SUMMARY

Examples of such a multiplexing optical system include, in addition to the multiplexing optical system of Conventional Example 1, a multiplexing optical system as illustrated in FIG. 7 (hereinafter, referred to as the "multiplexing optical system of Conventional Example 2"). The multiplexing optical system of Conventional Example 2 includes: a plurality of semiconductor laser light emitters 20; collimator lenses 30; a reduction optical system 40 to reduce a width of each laser beam on a fast axis side; a plurality of mirrors 70 to narrow a space between each laser beam on a slow axis side, that is, to bring each laser beam on an optical axis side of an optical fiber 60; a focusing lens 50; and the optical fiber 60.

The reduction optical system 40 is configured with a plano-convex lens 401 and a plano-concave lens 402.

Each mirror 70 is spaced apart in the slow axis direction. In the case of the multiplexing optical system of Conventional Example 2, depending on the size of each mirror 70, the size affects the space between two of the adjacent semiconductor laser light emitters 20 on the slow axis side to be opened up. Depending on the intended use of the multiplexing optical system, a narrower space between the semiconductor laser light emitters 20 is sometimes preferred than a wider space.

On the slow axis side, the beam diameter (width) after passing through the collimator is smaller than that on the fast axis side and thus the divergence angle of the collimated beam is larger than that on the fast axis side. Accordingly, the incidence on the optical fiber is insufficient (difficult) on the slow axis side. As a result, output from the optical fiber decreases.

It is an object of the present invention to provide a light source apparatus, a projector, and a machining apparatus that allow a space between laser diode devices to be as small as possible and sufficient incidence of a laser beam on a light guide in a slow axis direction.

An aspect of the present invention relates to a light source apparatus, including: a light emitter having a plurality of laser diode devices and packages to hold the respective laser diode devices;

a collimator disposed on an optical path of a laser beam emitted from each of the laser diode devices;

a focusing lens disposed on a downstream side in a direction of an optical axis of each laser diode device relative to the collimator and configured to condense the laser beams;

a light guide disposed on the downstream side in the direction of the optical axis relative to the focusing lens; and a magnification optical system disposed between the collimator and the focusing lens to bring a beam diameter in a slow axis direction of the laser beam passed through the collimator close to a beam diameter in a fast axis direction.

Another aspect of the present invention relates to a projector including the light source apparatus described above.

Still another aspect of the present invention relates to a machining apparatus including the light source apparatus described above.

The present invention allows the laser diode devices to be disposed as close to each other as possible, that is, densely with no gap. This allows the space between the laser diode devices to be as small as possible and allows an incident angle of the laser beam of each laser diode device to be kept small on the light guide. This facilitates, regardless of the position of each laser diode device, incidence of the laser beams emitted from the laser diode devices on the light guide.

DETAILED DESCRIPTION OF THE PREFERRED EMBODIMENTS

The light source apparatus, the projector, and the machining apparatus of the present invention are described below in detail based on preferred embodiments illustrated in the appended drawings.

First Embodiment

Figure 1:
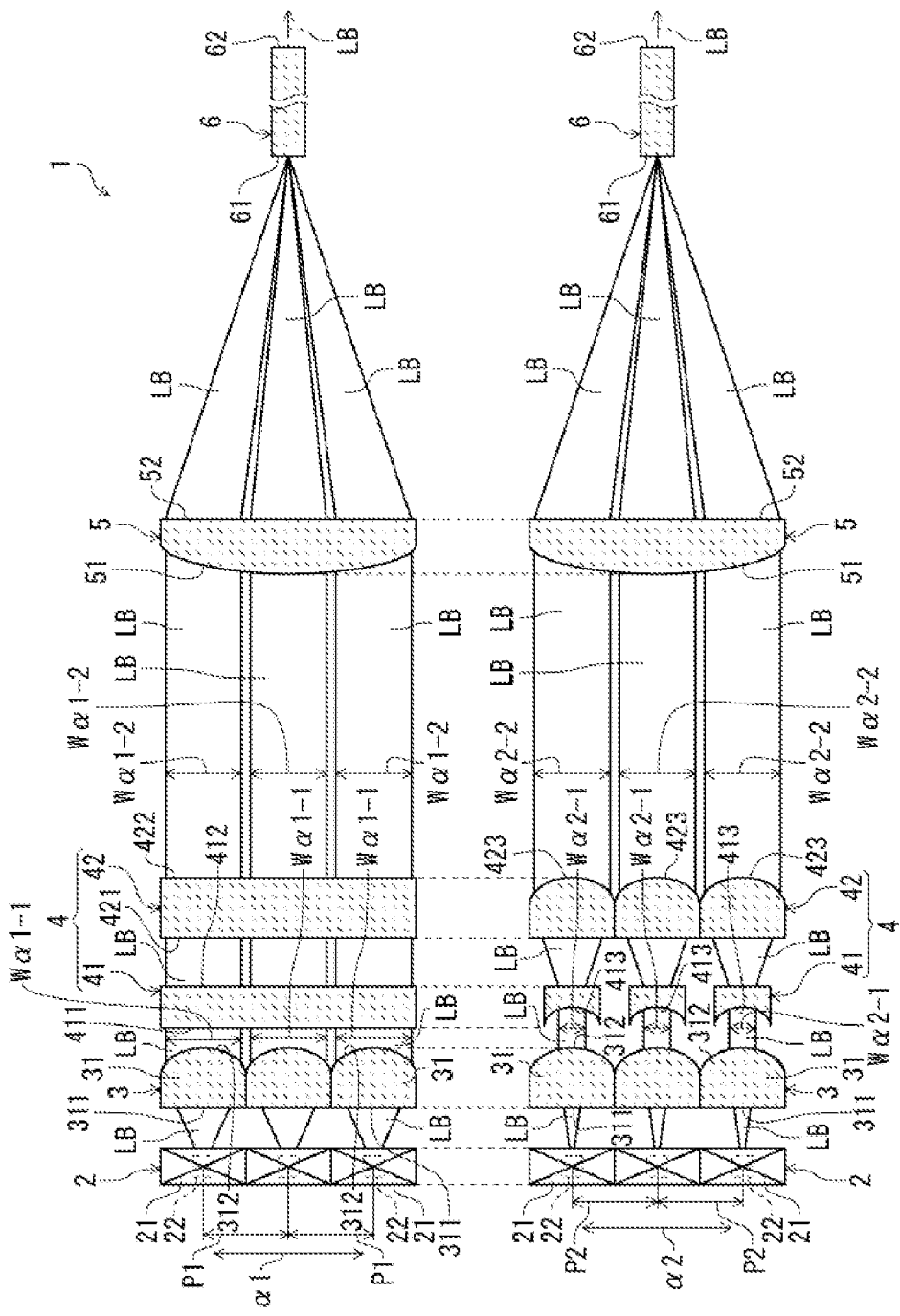
FIG. 1 is a schematic arrangement illustrating a first embodiment of a light source apparatus in the present invention.
Figure 2:
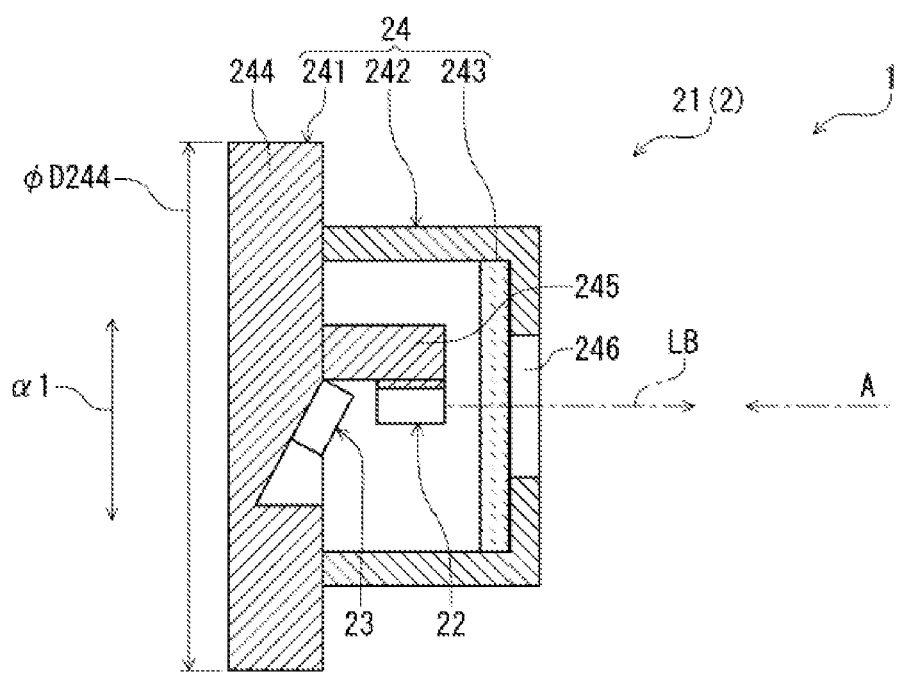
FIG. 2 is a vertical cross-sectional view of a light emitter included in the light source apparatus illustrated in FIG. 1.
Figure 3:
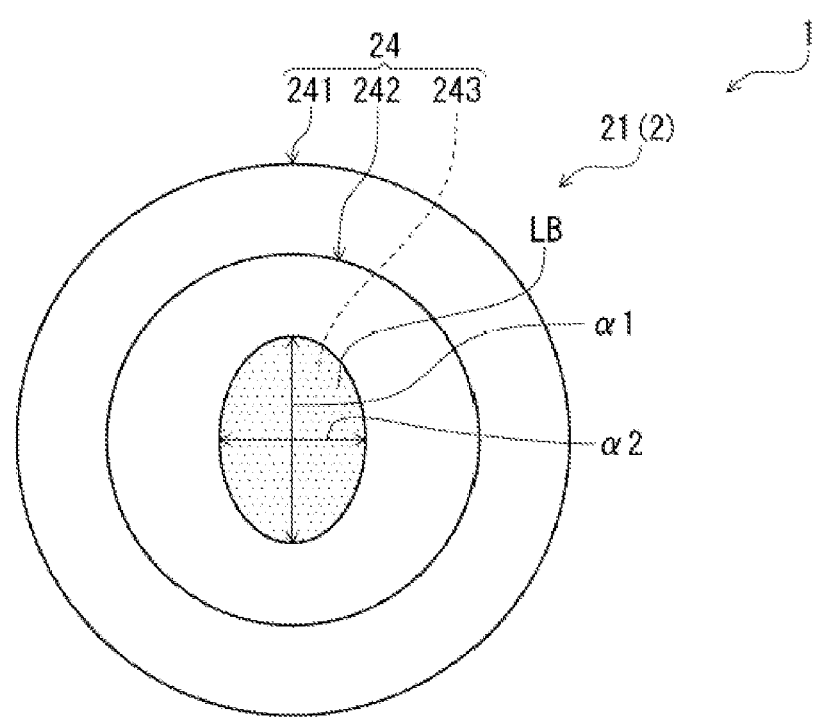
FIG. 3 is a diagram of the light emitter in FIG. 2 taken from an arrow A direction.
Figure 4:
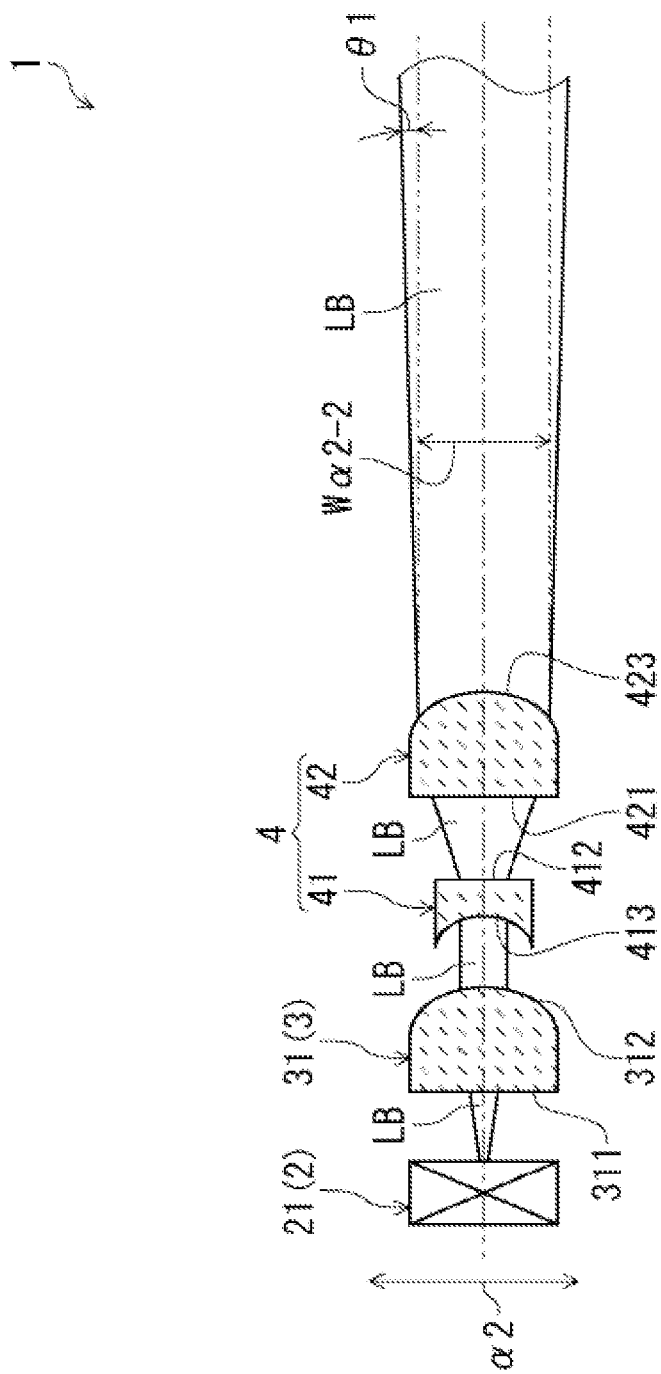
FIG. 4 is a diagram illustrating divergence of a laser beam on a slow axis side of the light source apparatus illustrated in FIG. 1.
Figure 5:
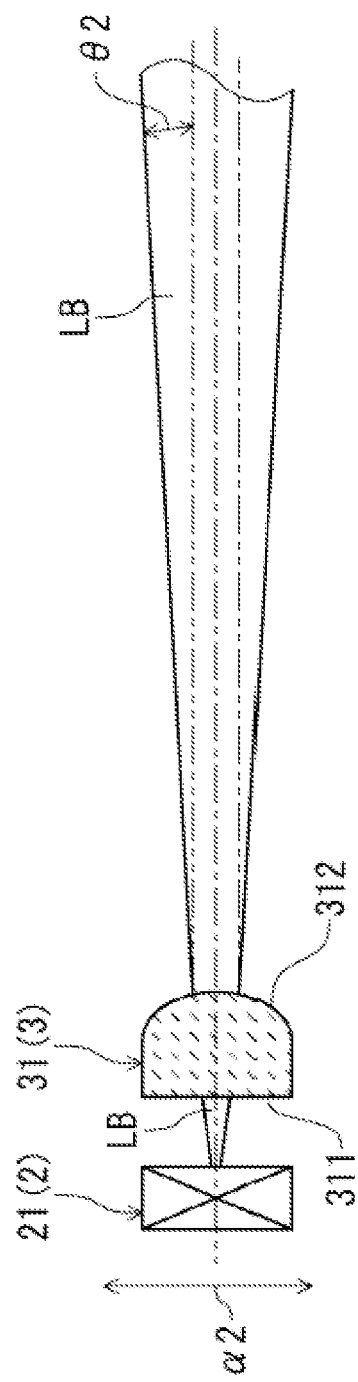
FIG. 5 is a diagram illustrating divergence of a laser beam on a slow axis side in the case of omitting the magnification optical system.

With reference to FIGS. 1 through 5, a description is given to the first embodiment of the light source apparatus, the projector, and the machining apparatus in the present invention. The arrangement on the upper side of FIG. 1 illustrates the arrangement configuration of parts in the light source apparatus in plan view parallel to a fast axis direction α1 of a laser beam, and the arrangement on a lower side of FIG. 1 illustrates the arrangement configuration of parts in the light source apparatus in plan view parallel to a slow axis direction α2 of the laser beam. In the following description, for the convenience of description, the left side of FIGS. 1, 4, and 5 is referred to as an "upstream side in a direction of an optical axis (or left side)" and the right side as a "downstream side in the direction of the optical axis (or right side)". The upstream side in the direction of the optical axis is sometimes referred to simply as the "upstream side" and the downstream side in the direction of the optical axis simply as the "downstream side".

A light source apparatus 1 illustrated in FIG. 1 includes a light emitter 2, a collimator 3, a magnification optical system 4, a focusing lens 5, and a light guide 6, disposed in order from the upstream side to the downstream side in the direction of the optical axis. As described later, the light source apparatus 1 is applicable to, for example, projectors and machining apparatuses. The configuration of the individual parts is described below.

The light emitter 2 has a plurality of LD packages 21. Since each LD package 21 has the same configuration, the configuration of one of the LD packages 21 is described as a representative.

As illustrated in FIG. 2, the LD package 21 has a laser diode device (LD element) 22, a photodiode 23, and a package 24.

The laser diode device 22 is capable of radiating a laser beam (semiconductor laser) LB. The laser diode device 22 is configured with, for example, a laminate having an active layer (light emission layer) and an n-type clad layer and a p-type clad layer that are disposed via the active layer. The active layer has both end faces as respective reflective surfaces. When a voltage is applied to the laser diode device 22 in the forward direction, electrons flow into the active layer from the n-type clad layer and also holes flow into the active layer from the p-type clad layer, recombining in the active layer to emit light. Since each clad layer has a lower refractive index than that of the active layer, the light moves back and forth while amplified between both end faces in the active layer. Then, stimulated emission occurs and causes the light to be radiated as the laser beam LB.

The laser beam LB emitted from the laser diode device 22 (active layer) is not perfectly linear light but travels divergently by diffraction. The laser diode device 22 as a laminate is formed to have a larger width than the thickness. As illustrated in FIG. 3, this causes the laser beam LB to have an intensity distribution (far field pattern) larger in the fast axis direction α1 of the laser beam LB than in the slow axis direction α2.

The package 24 collectively holds the laser diode device 22 and the photodiode 23. The package 24 is a so-called CAN package and has a base 241, a cap 242, and a cover glass 243.

The base 241 has a disk portion 244 having a disk shape to support the photodiode 23 and a support portion 245 formed protruding from the disk portion 244 to support the laser diode device 22. The disk portion 244 is a flange having an outer diameter as the maximally enlarged diameter in the package 24. When the LD package 21 is fixed to a predetermined spot in the light source apparatus 1, the disk portion 244 allows stable fixation of the LD package 21.

To the base 241, the cap 242 is fixed. The cap 242 is a member to cover the laser diode device 22 and the photodiode 23 supported by the base 241. The cap 242 has a through hole 264 formed to pass the laser beam LB therethrough.

The materials to configure the base 241 and the cap 242 are not particularly limited and may be, for example, a metal material, such as aluminum.

The cover glass 243 is a glass sheet to cover the through hole 264 from inside the cap 242. The laser beam LB is capable of transmitting through the cover glass 243. It should be noted that the cover glass 243 may be omitted from the package 24.

The LD packages 21 configured as above are disposed in a matrix of a plurality of rows in the fast axis direction α1 of the laser beam LB and a plurality of columns in the slow axis direction α2. As illustrated in FIG. 1, in the present embodiment, the number of the LD packages 21 disposed in the fast axis direction α1 is three and the number of the LD packages 21 disposed in the slow axis direction α2 is also three. However, the number of the LD packages 21 disposed in each direction is not limited to this example. In addition, the number of the LD packages 21 disposed in the fast axis direction α1 and the number of the LD packages 21 disposed in the slow axis direction α2 are not limited to be same and may be different.

A center-to-center distance (pitch) P1 between two of the laser diode devices 22 adjacent to each other in the fast axis direction α1 and a center-to-center distance (pitch) P2 between two of the laser diode devices 22 adjacent to each other in the slow axis direction α2 are equal. In the configuration illustrated in FIG. 1, both the laser diode devices 22 adjacent to each other in the fast axis direction α1 and the laser diode devices 22 adjacent to each other in the slow axis direction α2 contact with each other. In this case, the center-to-center distances P1 and P2 are equal to an outer diameter φD244 of the disk portion 244 to be the flange. It should be noted that the laser diode devices 22 may be apart from each other.

On an optical path of the laser beam LB, that is, on optical axes of the laser diode devices 22, the collimator 3 is disposed apart from the light emitter 2. The collimator 3 is configured with a plurality of circular lenses (piano-convex lenses) 31.

Each lens 31 has an incident surface 311, on which the laser beam LB is incident, and an exit surface 312, from which the laser beam LB exits. The incident surface 311 is configured with a flat surface. The exit surface 312 is configured with a curved convex surface. The exit surface 312 is generally in an aspheric shape, and the incident surface 311 may be a convex surface, a concave surface, or the like in accordance with the shape of the exit surface 312. It should be noted that the lenses 31 preferably have an effective diameter larger than the outer diameter φD244.

Each lens 31 is disposed facing the respective laser diode device 22 one by one. Each lens 31 is also disposed in a position where the optical axis of the respective laser diode device 22 passes through the center of the lens 31. This allows the laser beam LB emitted from each laser diode device 22 to be parallel light in both directions of the fast axis direction α1 and the slow axis direction α2. It should be noted that the collimator 3 may be configured with a combined lens.

The focusing lens 5 is disposed on the optical path of the laser beam LB and on a downstream side relative to the collimator 3. The collimator 3 and the focusing lens 5 are apart from each other, and the magnification optical system 4 is disposed between the collimator 3 and the focusing lens 5.

The focusing lens 5 is a lens to condense each laser beam LB towards the light guide 6. The focusing lens 5 has an incident surface 51, on which the laser beam LB is incident, and an exit surface 52, from which the laser beam LB exits. The incident surface 51 is configured with a curved convex surface. The exit surface 52 is configured with a flat surface. It should be noted that the laser beams LB condensed by the focusing lens 5 may overlap with each other different from the state illustrated in FIG. 1.

The light guide 6 is disposed on the optical path of the laser beam LB and on a downstream side relative to the focusing lens 5. The light guide 6 has an elongated shape and has an end face on the upstream side to be an incident surface 61 and an end face on the downstream side to be an exit surface 62. On the incident surface 61, the plurality of laser beams LB condensed by the focusing lens 5 are collectively incident. The laser beams LB pass through the light guide 6 and are led to the exit surface 62 and allowed to exit from the exit surface 62. The light guide 6 is not particularly limited, and for example, optical fibers, optical waveguides, and the like may be used.

As described earlier, in the multiplexing optical system of Conventional Example 2, the space between two of the semiconductor laser light emitters adjacent to each other on the slow axis side turns out to be opened up. In this case, a semiconductor laser light emitter positioned more outside from the optical axis of the optical fiber, that is, positioned farther from the optical axis of the optical fiber causes an increase in the incident angle of the laser beam on the incident surface of the optical fiber. Depending on the magnitude of the incident angle, the laser beam is likely to be reflected on the incident surface of the optical fiber and is sometimes not allowed to be incident on the incident surface. As a result, the output of the optical fiber decreases.

The light source apparatus 1 is configured to overcome such a defect. The configuration and action are described below.

As illustrated in FIG. 1, the light source apparatus 1 includes the magnification optical system 4.

In front and behind the magnification optical system 4, each laser beam LB has a steadily maintained beam diameter (beam width) in the fast axis direction $\alpha 1$ and an enlarged beam diameter (beam width) in the slow axis direction $\alpha 2$. It should be noted that the values allowed to be used as each beam diameter are values measured between two points where the intensity of the laser beam LB becomes $1/e^2$ of the peak value.

That is, in the fast axis direction $\alpha 1$, a beam diameter W$\alpha$1-1 before transmission through the magnification optical system 4 is equal to a beam diameter W$\alpha$1-2 after transmission through the magnification optical system 4. Meanwhile, in the slow axis direction $\alpha 2$, a beam diameter W$\alpha$2-1 before transmission through the magnification optical system 4 becomes a beam diameter W$\alpha$2-2 after transmission through the magnification optical system 4, and the beam diameter W$\alpha$2-2 is larger than the beam diameter W$\alpha$2-1. The beam diameter W$\alpha$2-2 is preferably equal to the beam diameter W$\alpha$1-2.

The magnification optical system 4 is thus disposed between the collimator 3 and the focusing lens 5 to enlarge the beam diameter W$\alpha$2-1 of the laser beam LB transmitted through the collimator 3 in the slow axis direction $\alpha 2$ to be brought close to the beam diameter W$\alpha$1-2 in the fast axis direction $\alpha 1$.

The magnification optical system 4 in the present embodiment has a specific configuration including first lenses 41 and second lenses 42. The first lenses 41 and the second lenses 42 are respectively cylindrical lenses having a power only in the slow axis direction $\alpha 2$. The first lenses 41 and the second lenses 42 are disposed in order from the upstream side to the downstream side in the direction of the optical axis.

The first lenses 41 are disposed apart from the collimator 3. The first lenses 41 have incident surfaces 411, on which the laser beams LB are incident, and exit surfaces 412, from which the laser beams LB exit. The incident surfaces 411 are configured with a plurality of concave surfaces 413 formed to have a depth continuously varying in the slow axis direction $\alpha 2$. Meanwhile, the exit surfaces 412 are configured with flat surfaces. Each first lens 41 has an optical axis disposed to coincide with the optical axis of each laser diode device 22. Due to such incident surfaces 411 and exit surfaces 412, the first lenses 41 are cylindrical lenses having a power in the slow axis direction $\alpha 2$ greater than that in the fast axis direction $\alpha 1$. This causes the laser beams LB in the fast axis direction $\alpha 1$ to remain as the parallel light and the laser beams LB in the slow axis direction $\alpha 2$ to be divergent.

It should be noted that, although the first lenses 41 in the present embodiment have the incident surfaces 411 configured with the concave surfaces 413 and the exit surfaces 412 configured with the flat surfaces, they are not limited to this configuration and may have, for example, the exit surfaces 412 configured with concave surfaces and the incident surfaces 411 configured with flat surfaces.

On the downstream side of the first lenses 41, the second lenses 42 are disposed apart from the first lenses 41. The second lenses 42 have incident surfaces 421, on which the laser beams LB are incident, and exit surfaces 422, from which the laser beams LB exit. The incident surfaces 421 are configured with flat surfaces. Meanwhile, the exit surfaces 422 are configured with convex surfaces 423 formed to have a protruding height continuously varying in the slow axis direction $\alpha 2$. Each second lens 42 has an optical axis disposed to coincide with the optical axis of each laser diode device 22. Due to such incident surfaces 421 and exit surfaces 422, the second lenses 42 are cylindrical lenses that are capable of shaping the laser beams LB into parallel light in the slow axis direction $\alpha 2$.

The first lenses 41 and the second lenses 42 allow the beam diameter W$\alpha$2-2 in the slow axis direction $\alpha 2$ after transmission through the magnification optical system 4 to be enlarged greater than the beam diameter W$\alpha$1-1 in the slow axis direction $\alpha 2$ before transmission through the magnification optical system 4. The magnification range is more preferably, for example, from 1.5 to 6.0 times. This allows the beam diameter W$\alpha$2-1 in the slow axis direction $\alpha 2$ to be brought close to the beam diameter W$\alpha$2-2 in the fast axis direction $\alpha 1$ having a size equivalent to the beam diameter W$\alpha$2-2 in the slow axis direction $\alpha 2$.

The magnification optical system 4 is preferably disposed to bring the beam diameter W$\alpha$1-1 in the fast axis direction $\alpha 1$ after transmission through the collimator 3 equal to the outer diameter $\phi$D244 of the packages 24 or equal to the center-to-center distance P1. It should be noted that, as described earlier, two of the laser diode devices 22 adjacent to each other in the fast axis direction $\alpha 1$ in the present embodiment contact with each other and thus the center-to-center distance P1 and the outer diameter $\phi$D244 are the same size.

This allows the light emitter 2 to have the LD packages 21 disposed as close to each other as possible in the fast axis direction α1, that is, disposed densely (closely packed) with no gap. The LD packages 21 in the slow axis direction α2 are similarly allowed to be disposed densely.

The magnification optical system 4 configured as above allows the space between the LD packages 21 (laser diode devices 22) to be as small as possible. This allows each LD package 21 to be disposed as close as possible to the optical axis of the light guide 6. It is then possible to keep the incident angle of the laser beam LB from each LD package 21 small on the incident surface 61 of the light guide 6 in both the fast axis direction α1 and the slow axis direction α2. This facilitates incidence of the laser beam LB emitted from each LD package 21 on the incident surface 61 of the light guide 6 regardless of the position of the LD package 21.

This configuration thus allows sufficient incidence of each laser beam LB on the light guide 6 not only in the fast axis direction α1 but also in the slow axis direction α2 (hereinafter, this effect is referred to as "ease of incidence"). The ease of incidence is also maintained similarly in the case of increasing the number of the disposed LD packages 21 greater than that in the configuration illustrated in FIG. 1. It is thus possible to sufficiently secure the output from the light guide 6 in accordance with the use of the light source apparatus 1.

The light source apparatus 1 is allowed to omit the mirrors used to be used in the multiplexing optical system of Conventional Example 2. This allows each laser beam LB to have an optical path length shorter than that in the multiplexing optical system of Conventional Example 2 and thus improves the ease of incidence. It is also possible to downsize the light source apparatus 1 by the amount of the omitted mirrors.

As described earlier, the second lenses 42 are the lenses to shape the laser beams LB into parallel light. Ideally, the laser beams LB are shaped into parallel light by the second lenses 42. However, as illustrated in FIG. 4, the laser beams LB strictly has a divergence angle (spread angle) θ1 to be gradually, though slightly, divergent.

In contrast, as illustrated in FIG. 5, in the case of omitting the magnification optical system 4, each laser beam LB has a larger divergence angle (spread angle) θ2 than the divergence angle θ1 and is thus not preferred because of the larger divergence than the state illustrated in FIG. 4.

Each second lens 42 preferably has the divergence angle θ1 of the laser beam LB after transmission through the second lens 42 sets to 1 mm rad or less. It is thus possible to keep the influence by the divergence angle θ1 (e.g., the decrease in the multiplex ratio of the light guide 6, etc.) as small as possible.

Second Embodiment

Figure 6:
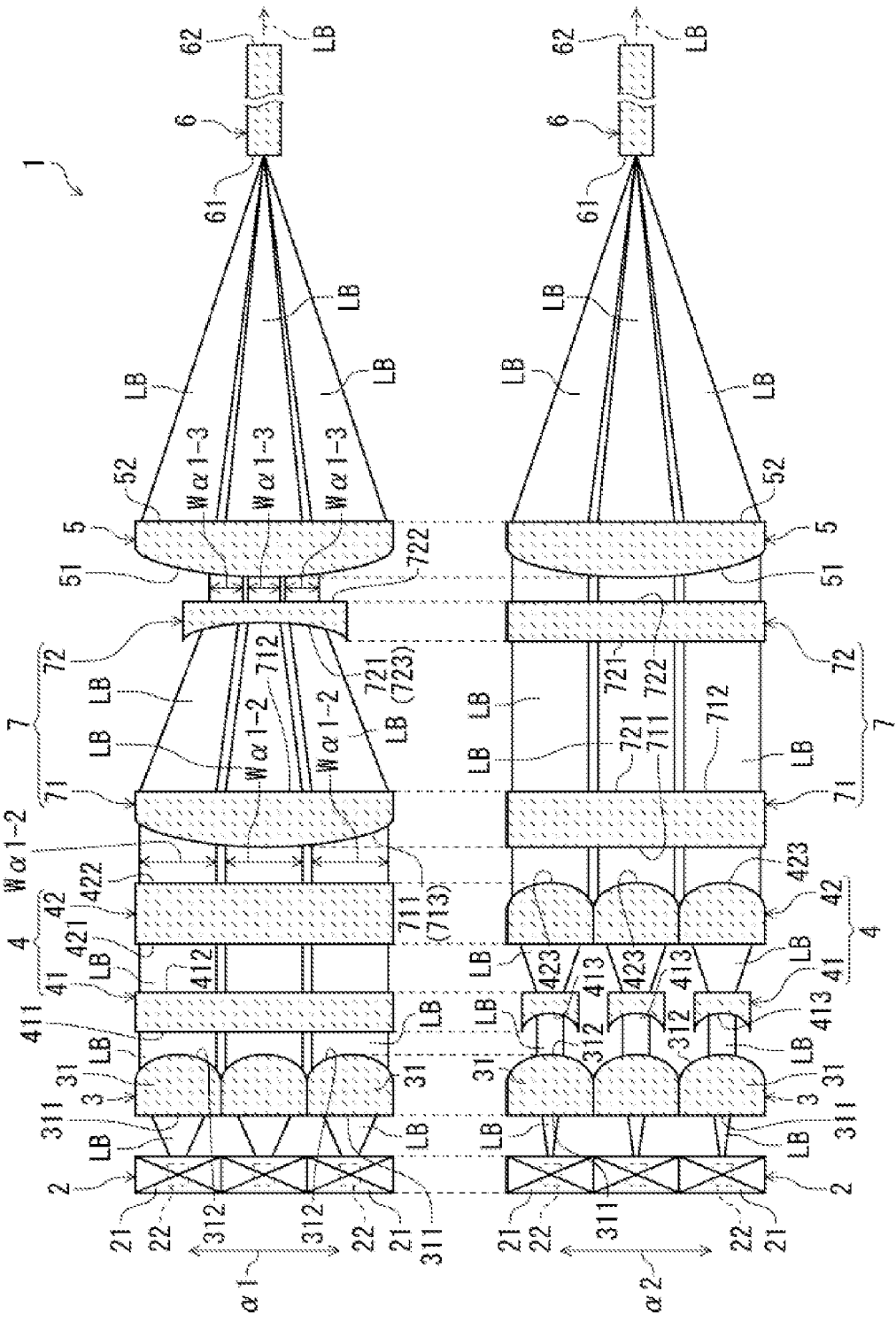
FIG. 6 is a schematic arrangement illustrating a second embodiment of the light source apparatus of the present invention.
Figure 7:
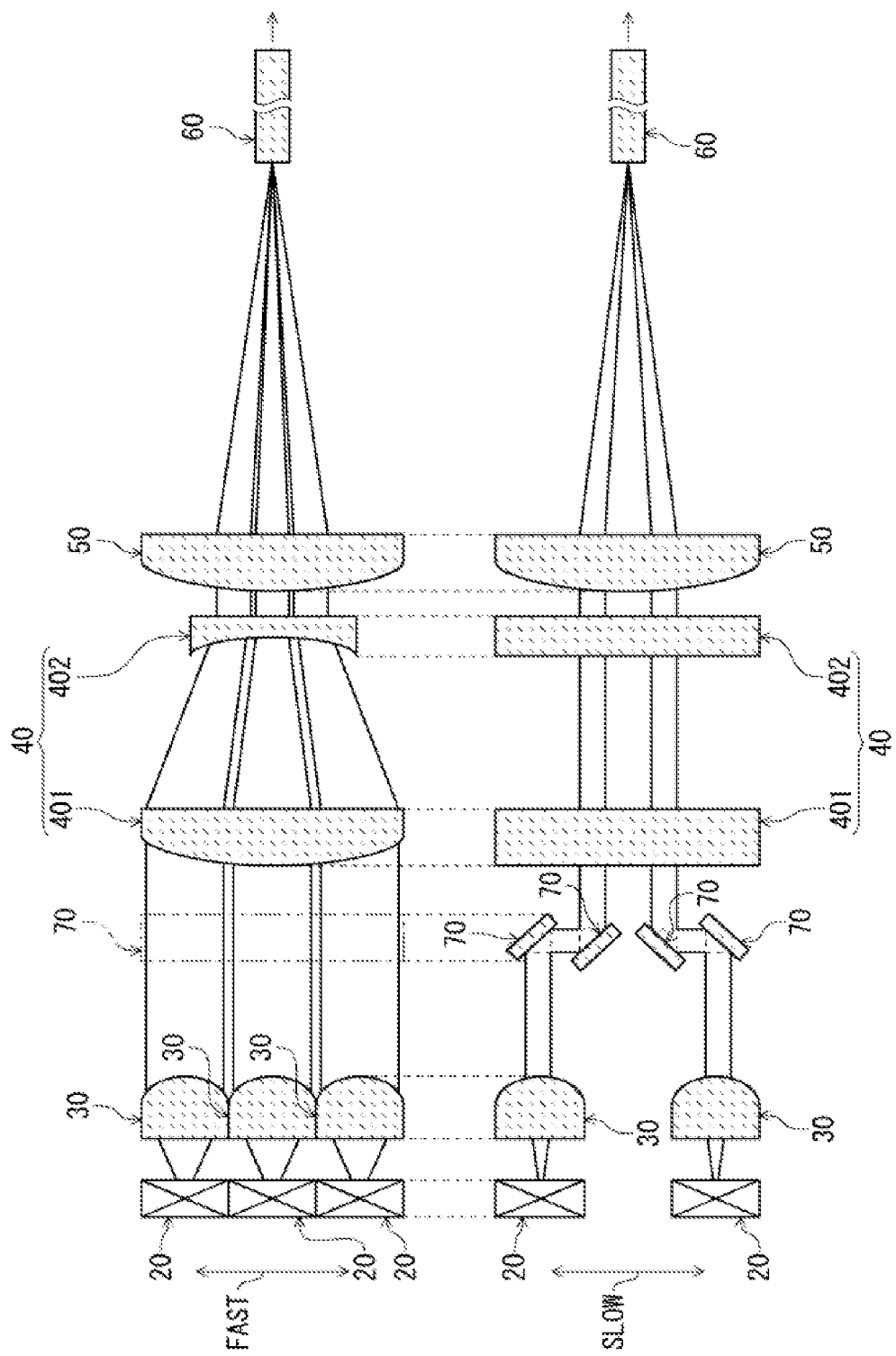
FIG. 7 is a schematic arrangement of the multiplexing optical system of Conventional Example 2.

With reference to FIG. 6, a second embodiment of the light source apparatus, the projector, and the machining apparatus of the present invention is described below. The description is given mainly to the differences from the embodiment described earlier to omit the description on the similar points.

The present embodiment is same as the first embodiment above except for the light source apparatus including a reduction optical system.

As illustrated in FIG. 6, the light source apparatus 1 includes a reduction optical system 7 disposed between the magnification optical system 4 (collimator 3) and the focusing lens 5. The reduction optical system 7 reduces the beam diameter Wα1-2 in the fast axis direction α1 after transmission through the magnification optical system 4 (collimator 3) to a smaller beam diameter Wα2-3 than the beam diameter Wα1-2.

Such a light source apparatus is sometimes expected to have more LD packages 21 disposed in the fast axis direction α1 than the configuration illustrated in FIG. 6 in accordance with the use. In this case, the reduction optical system 7 disposed between the magnification optical system 4 and the focusing lens 5 allows the laser beam LB from each LD package 21 to be directed to the focusing lens 5 for sufficient incidence.

The reduction optical system 7 has a first reducing lens 71 and a second reducing lens 72.

The first reducing lens 71 has an incident surface 711, on which the laser beam LB is incident, and an exit surface 712, from which the laser beam LB exits. The incident surface 711 has a convex surface 713 formed to have a protruding height continuously varying in the fast axis direction α1. The convex surface 713 is disposed in a position where the optical axis of the focusing lens 5 passes through the center of the convex surface 713. Meanwhile, the exit surface 712 is configured with a flat surface.

On the downstream side of the first reducing lens 71, the second reducing lens 72 is disposed apart from the first reducing lens 71. The second reducing lens 72 has an incident surface 721, on which the laser beam LB is incident, and an exit surface 722, from which the laser beam LB exits. The incident surface 721 has a concave surface 723 formed to have a depth continuously varying in the fast axis direction α1. Similar to the convex surface 713, the concave surface 723 is disposed in a position where the optical axis of the focusing lens 5 passes through the center of the concave surface 723. Meanwhile, the exit surface 722 is configured with a flat surface.

It should be noted that, although the second reducing lens 72 in the present embodiment has the incident surface 721 configured with the concave surface 723 and the exit surface 722 configured with the flat surface, the second reducing lens 72 is not limited to this configuration and may have, for example, the exit surface 722 configured with a concave surface and the incident surface 721 configured with a flat surface.

Such a first reducing lens and a second reducing lens allow the beam diameter Wα1-2 to be reduced to the beam diameter Wα2-3 with the simple configuration.

Application Example 1

The following description is given to an example of applications of the light source apparatus 1.

The light source apparatus 1 is applicable to projectors that project an image and the like on a screen. Such a projector includes the light source apparatus 1. In this case, the light source apparatus 1 is configured to radiate the laser beams LB respectively in red, green, and blue having different wavelengths from each other. This allows the light source apparatus 1 to project a color image.

Application Example 2

The following description is given to another example of applications of the light source apparatus 1.

The light source apparatus 1 is applicable to a machining apparatus for laser processing. The machining apparatus includes the light source apparatus 1. In this case, the light source apparatus 1 is configured to radiate, for example, the laser beams LB respectively in blue having different wavelengths from each other. This allows the light source apparatus 1 to perform laser processing of, for example, cutting a metal plate.

Although the light source apparatus, the projector, and the machining apparatus of the present invention have been described with reference to the illustrated embodiments, the present invention is not limited to them and each component constituting the light source apparatus, the projector, and the machining apparatus may be substituted by an arbitrary configuration capable of exhibiting the same function. In addition, an arbitrary configuration may be added.

Moreover, the light source apparatus, the projector, and the machining apparatus of the present invention may be a combination of two or more arbitrary configurations (features) in the respective embodiments above.

Furthermore, although the magnification optical system 4 in each of the above embodiments is configured to have the first lenses 41 and the second lenses 42, the magnification optical system 4 is not limited to this configuration and, for example, an anamorphic prism pair may be used as the magnification optical system 4.

Aspects

Those skilled in the art understand that the plurality of embodiments described above as exemplifications are specific examples of the following aspects.

First Aspect: A light source apparatus, including:

a light emitter having a plurality of laser diode devices and packages to hold the respective laser diode devices;

a collimator disposed on an optical path of a laser beam emitted from each of the laser diode devices;

a focusing lens disposed on a downstream side in a direction of an optical axis of each laser diode device relative to the collimator and configured to condense the laser beams;

a light guide disposed on the downstream side in the direction of the optical axis relative to the focusing lens; and a magnification optical system disposed between the collimator and the focusing lens to bring a beam diameter in a slow axis direction of the laser beam transmitted through the collimator close to a beam diameter in a fast axis direction.

In accordance with the light source apparatus according to the first aspect, it is possible to dispose the laser diode devices as close to each other as possible, that is, dispose them densely with no gap. This allows the space between the laser diode devices to be as small as possible and also allows the incident angle of the laser beam from each laser diode device to be kept small on the light guide. This facilitates incidence of the laser beam emitted from each laser diode device on the light guide regardless of the position of the laser diode device.

Second Aspect: In the light source apparatus according to the first aspect, a center-to-center distance between two of the laser diode devices adjacent to each other is equal in the fast axis direction and in the slow axis direction, and the magnification optical system is disposed to bring the beam diameter in the fast axis direction after transmission through the collimator equal to an outer diameter of the package or equal to the center-to-center distance.

In accordance with the light source apparatus according to the second aspect, it is possible to dispose the laser diode devices as close to each other as possible, that is, dispose them densely with no gap.

Third Aspect: In the light source apparatus according to the first or second aspect, the magnification optical system magnifies a beam diameter in the slow axis direction after transmission through the collimator within a range from 1.5 to 6.0 times a beam diameter in the slow axis direction before transmission through the collimator.

In accordance with the light source apparatus according to the third aspect, it is possible to bring a beam diameter W in the slow axis direction close to the beam diameter in the fast axis direction.

Fourth Aspect: the light source apparatus according to any one the first through third aspects, the magnification optical system includes:

a first lens having an incident surface, on which the laser beam is incident, configured with a concave surface and an exit surface, from which the laser beam exits, configured with a flat surface; and a second lens disposed on the downstream side in the direction of the optical axis relative to the first lens and having an incident surface, on which the laser beam is incident, configured with a flat surface and an exit surface, from which the laser beam exits, configured with a convex surface.

In accordance with the light source apparatus according to the fourth aspect, for example, the first lens is a lens having a power in the slow axis direction greater than in the fast axis direction and the second lens is a lens to shape the light exited from the first lens into parallel light.

Fifth Aspect: In the light source apparatus according to the fourth aspect, the first lens is a lens having a power in the slow axis direction greater than in the fast axis direction, and the second lens is a lens to shape the beam exited from the first lens into parallel light.

In accordance with the light source apparatus according to the fifth aspect, it is possible to bring the beam diameter of the laser beam transmitted through the collimator in the slow axis direction close to the beam diameter in the fast axis direction with the simple configuration.

Sixth Aspect: In the light source apparatus according to the fifth aspect, the second lens sets a divergence angle of the laser beam after transmission through the second lens to 1 mm rad or less.

In accordance with the light source apparatus according to the sixth aspect, it is possible to keep the influence by the divergence angle of the laser beam (e.g., the decrease in the multiplex ratio of the light guide, etc.) as small as possible Seventh Aspect: The light source apparatus according to any one of the first through sixth aspects, further including a reduction optical system disposed between the collimator and the focusing lens and configured to reduce the beam diameter in the fast axis direction after transmission through the collimator.

Such a light source apparatus is sometimes expected to have more laser diode devices disposed in the fast axis direction than the configuration illustrated in FIG. 6 in accordance with the use. In this case, in accordance with the light source apparatus according to the seventh aspect, it is possible to direct the laser beam from each laser diode device to the focusing lens for sufficient incidence.

Eighth Aspect: In the light source apparatus according to the seventh first aspect, the reduction optical system includes:

a first reducing lens having an incident surface, on which the laser beam is incident, configured with a convex surface and an exit surface, from which the laser beam exits, configured with a flat surface; and a second reducing lens disposed on the downstream side in the direction of the optical axis relative to the first reducing lens and having an incident surface, on which the laser beam is incident, configured with a concave surface and an exit surface, from which the laser beam exits, configured with a flat surface.

In accordance with the light source apparatus according to the eighth aspect, it is possible to reduce the beam diameter in the fast axis direction after transmission through the collimator with the simple configuration.

Ninth Aspect: A projector according to one aspect including the light source apparatus according to any one of the first through eighth aspects.

In accordance with the projector according to the ninth aspect, it is possible to dispose the laser diode devices as close to each other as possible, that is, dispose them densely with no gap. This allows the space between the laser diode devices to be as small as possible and also allows the incident angle of the laser beam from each laser diode device to be kept small on the light guide. This facilitates incidence of the laser beam emitted from each laser diode device on the light guide regardless of the position of the laser diode device.

Tenth Aspect: A machining apparatus according to one aspect including the light source apparatus according to any one of the first through eighth aspects.

In accordance with the machining apparatus according to the tenth aspect, it is possible to dispose the laser diode devices as close to each other as possible, that is, dispose them densely with no gap. This allows the space between the laser diode devices to be as small as possible and also allows the incident angle of the laser beam from each laser diode device to be kept small on the light guide. This facilitates incidence of the laser beam emitted from each laser diode device on the light guide regardless of the position of the laser diode device.

What is claimed is:

1. A light source apparatus, comprising:
    a light emitter having a plurality of laser diode devices and packages to hold the respective laser diode devices;
    a collimator disposed on an optical path of a laser beam emitted from each of the laser diode devices;
    a focusing lens disposed on a downstream side in a direction of an optical axis of each of the laser diode devices relative to the collimator and configured to condense the laser beams;
    a light guide disposed on the downstream side in the direction of the optical axis relative to the focusing lens; and
    a magnification optical system disposed between the collimator and the focusing lens to bring a beam diameter in a slow axis direction of the laser beam passed through the collimator close to a beam diameter in a fast axis direction;
    wherein the magnification optical system is disposed to bring the beam diameter in the fast axis direction after transmission through the collimator equal to an outer diameter of the package or equal to a center-to-center distance between two of the laser diode devices adjacent to each other.

2. The light source apparatus according to claim 1, wherein
    the center-to-center distance is equal in the fast axis direction and in the slow axis direction.

3. The light source apparatus according to claim 1, wherein the magnification optical system magnifies a beam diameter in the slow axis direction after transmission through the magnification optical system within a range from 1.5 to 6.0 times a beam diameter in the slow axis direction before transmission through the magnification optical system.

4. The light source apparatus according to claim 1, wherein the magnification optical system includes:
    a first lens having an incident surface, on which the laser beam is incident, configured with a concave surface and an exit surface, from which the laser beam exits, configured with a flat surface; and
    a second lens disposed on the downstream side in the direction of the optical axis relative to the first lens and having an incident surface, on which the laser beam is incident, configured with a flat surface and an exit surface, from which the laser beam exits, configured with a convex surface.

5. The light source apparatus according to claim 4, wherein
    the first lens is a lens having a power in the slow axis direction greater than in the fast axis direction, and
    the second lens is a lens to shape the laser beam into parallel light.

6. The light source apparatus according to claim 5, wherein the second lens sets a divergence angle of the laser beam after transmission through the second lens to 1 mm rad or less.

7. The light source apparatus according to claim 1, further comprising a reduction optical system disposed between the collimator and the focusing lens and configured to reduce the beam diameter in the fast axis direction after transmission through the collimator.

8. The light source apparatus according to claim 7, wherein the reduction optical system includes:
    a first reducing lens having an incident surface, on which the laser beam is incident, configured with a convex surface and an exit surface, from which the laser beam exits, configured with a flat surface; and
    a second reducing lens disposed on the downstream side in the direction of the optical axis relative to the first reducing lens and having an incident surface, on which the laser beam is incident, configured with a concave surface and an exit surface, from which the laser beam exits, configured with a flat surface.

9. A projector comprising the light source apparatus according to claim 1.

10. A machining apparatus comprising the light source apparatus according to claim 1.

* * * * *